(12) United States Patent
Sedayao

(10) Patent No.: US 9,537,831 B2
(45) Date of Patent: Jan. 3, 2017

(54) REACHING ANONYMIZATION SERVICE LEVELS THROUGH ADDED TRANSACTIONS

(71) Applicant: Intel Corporation, Santa Clara, CA (US)

(72) Inventor: Jeffrey C. Sedayao, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 21 days.

(21) Appl. No.: 14/543,720

(22) Filed: Nov. 17, 2014

(65) Prior Publication Data

US 2016/0142378 A1 May 19, 2016

(51) Int. Cl.
| | |
|---|---|
| G06F 21/00 | (2013.01) |
| H04L 29/06 | (2006.01) |
| G06F 21/60 | (2013.01) |
| G06F 21/62 | (2013.01) |

(52) U.S. Cl.
CPC ........... H04L 63/0421 (2013.01); G06F 21/60 (2013.01); G06F 21/6254 (2013.01)

(58) Field of Classification Search
CPC  G06F 21/6254; G06F 21/6227; G06F 19/321; G06F 21/60
USPC .......................................................... 726/26
See application file for complete search history.

(56) References Cited

U.S. PATENT DOCUMENTS

| | | | | |
|---|---|---|---|---|
| 2008/0010218 | A1* | 1/2008 | Zank ....................... | G06F 21/64 705/75 |
| 2013/0067023 | A1* | 3/2013 | Joy ..................... | H04L 63/1458 709/217 |
| 2013/0198194 | A1* | 8/2013 | Chen ................. | G06F 17/30539 707/740 |
| 2013/0332987 | A1* | 12/2013 | Tenneti ................... | G06F 21/10 726/1 |
| 2014/0013435 | A1* | 1/2014 | Palumbo ................ | G06F 21/56 726/24 |

OTHER PUBLICATIONS

Sedayao et al., "Making Big Data, Privacy, and Anonymization work together in the Enterprise: Experiences and Issues", Jun. 2014, 7 pages.

* cited by examiner

*Primary Examiner* — Syed Zaidi
(74) *Attorney, Agent, or Firm* — Schwabe, Williamson & Wyatt, P.C.

(57) ABSTRACT

Methods, apparatuses, systems, and computer-readable media for an anonymization service level improvement system ("ALI") are described. One or more transactions may be generated by a system to be transmitted outside of a secure area. The ALI may anonymize these transactions and anonymization may be measured by reference to one or more anonymization metrics, including, but not limited to, k-anonymity, l-diversity, and t-closeness. The ALI may be configured to determine current values for the metrics and whether current anonymization is sufficient to provide a pre-determined service level. If the service level is not sufficient, then the ALI may generate fake anonymized transactions to be output to satisfy the pre-determined service levels of the one or more anonymization metrics. Results may be received which may include valid and invalid results. The ALI may remove the invalid results before returning the valid results to the system. Other embodiments may be described and/or claimed.

25 Claims, 7 Drawing Sheets

REACHING ANONYMIZATION SERVICE LEVELS THROUGH ADDED TRANSACTIONS

TECHNICAL FIELD

The present disclosure relates to the field of data processing, in particular, to apparatuses, methods and storage media associated with improving anonymization service levels.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Many computing systems deal in transactions involving sensitive data. For example, health care information systems frequently utilize patient data which can only be shared under carefully prescribed, secure circumstances. Similarly, financial systems, including banking, credit, and/or payroll systems, utilize account or balance information that must be secured in order to prevent misuse, such as identity theft.

Despite these security needs, however, many systems must utilize less-secure computing resources, such as cloud-based servers or storage, or even the use of less-secure communication channels in between secure systems, in order to perform necessary activities. In such circumstances, there may exist a tension between the needs for security and the need to use the less-secure resources. One solution to this problem has been to anonymize data that is sent between systems. For example, information identifying a particular patient may be stripped from a transaction request before it is sent from a secure system, while leaving information that is needed to complete a transaction request. In other techniques, information about multiple persons may be combined to generate anonymized transaction requests.

However, not all anonymization techniques always produce desired levels of anonymization. For example, if only one transaction is transmitted from a system in an hour and only one person was known to use the system that hour, user anonymity may effectively be negated for that transaction. In another example a study with data about a group of people with leg fractures may have indications of other medical conditions the people in the study have. If only one of the people in the study has coronary artery disease, and there is only one person over age 70 in the group, that person's identity may be compromised. Thus, simple anonymizing of transactions may not be sufficient to obtain a desired level of anonymity.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1:
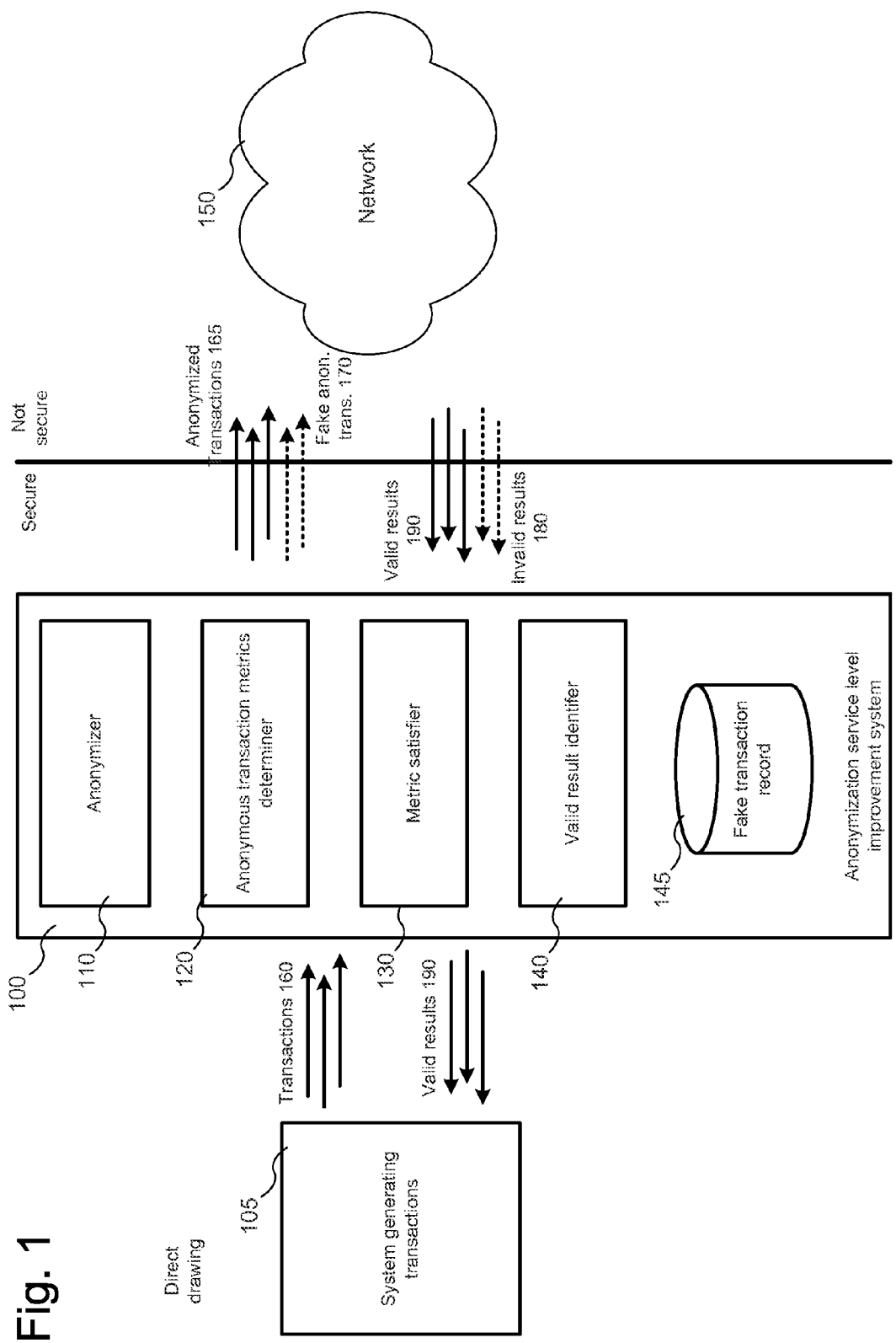
FIG. 1 illustrates an example arrangement for a computing system configured to improve anonymization service levels, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. As described herein, the term "logic" and "module" may refer to, be part of, or include a System on a Chip, as described below.

Methods, apparatuses, systems, and computer-readable media are described herein for an anonymization service level improvement and related systems ("ALI"). In various embodiments, one or more transactions may be generated by a system to be transmitted outside of a secure area (which may be a secure network, a secure system, etc.), such as to obtain results from external processes that may be performed on the information in the transactions. The ALI may anonymize these transactions prior to their being transmitted outside of the secure area. Further, anonymization may be measured for one or more anonymized transactions generated by a system to be released outside of a secure area (which may be a secure network, a secure system, etc.). This anonymization may be measured by reference to one or more anonymization metrics, including, but not limited to, k-anonymity, l-diversity, and t-closeness. In various embodiments, the ALI may be configured to determine current values for the one or more anonymization metrics. Through such determination, the ALI may determine whether current anonymization is sufficient to provide a pre-determined service level of anonymization for the transactions.

If the service level is not sufficient (e.g., if the values determined for the anonymization metrics are not up to pre-determined levels) then the ALI, through operation of a metric satisfier module, may generate one or more fake anonymized transactions to be output from the secure network in addition to the anonymized transactions that were previously generated and for which real results are needed. The metric satisfier may generate these fake anonymized transactions in such a manner as to satisfy the pre-determined service levels of the one or more anonymization metrics. The fake anonymized transactions may then be transmitted outside of the secure area, along with the real anonymized transactions. Results may be received from the non-secure area in response to transmission of the anonymized transactions. The results may include valid results (received based on the original value anonymized transactions) and invalid results (based on the fake anonymized transactions). The ALI may remove the invalid results and may return the valid results to the original system that generated the original transactions. Thus, through the use of the ALI to generate fake anonymized transactions and process the results, desired service levels of anonymization may be maintained while still obtaining results from transmission of the original transactions outside of the secure area.

Referring now to FIG. 1, an example arrangement for a computing system configured to improve anonymization service levels is illustrated in accordance with various embodiments. In various embodiments, an anonymization service level improvement system 100 ("ALI 100") may be configured to assist a system 105 in transmitting transactions outside of a secure area to a non-secure area, such as a non-secure network 150. In various embodiments, the system 105 may include a system that generates one or more transactions which are to be transmitted from a secure area to a non-secure area for processing. Examples of such systems may include, but are not limited to, health care systems, financial systems, human resources systems, payroll systems, etc.

In various embodiments, the ALI 100 and the system 105 may interoperate and/or communicate within a secure area. In various embodiments, the secure area may include various types of trusted environments. For example, the secure area may include a secure network over which the ALI 100 and the system 105 may communicate. In other embodiments, the secure area may include a physical location in which the system 105 and the ALI 100 may both be located, such as, e.g. when the system 105 and the ALI 100 are both attached to a physically-limited local-area network. In other embodiments, the secure area may include a secured computing system which may incorporate all or part of the system 105 and/or the ALI 100. Thus, in some embodiments, the system 105 and the ALI 100 may be included on the same computing systems, or even the same computing device. In various embodiments, transactions may be transmitted to a non-secure area, which may include a non-secure network 150. In various embodiments, the non-secure network 150 may include various networks which may not be assumed to provide a desired level of security, such as the Internet, wide-area networks, wireless networks, etc. The non-secure area may, in various embodiments, include additional computing systems or computing devices, not illustrated, which may be connected to the ALI 100 and/or system 105 in the secure area through the non-secure network 150. In various embodiments, these additional computing systems or computing devices may themselves be secured to various degrees, but may be assumed to be insecure because they are communicated with through the non-secure network 150.

In various embodiments, the ALI may be configured to receive one or more transactions 160 from the system 105. The transactions 160 may be received by the ALI 100 prior to transmission of the transactions 160 outside of the secure area. In some embodiments, the ALI 100 may receive the transactions 160 via a direct interconnection and/or a secure network. In other embodiments, such as when the ALI 100 is incorporated with the system 105, the ALI 100 may not receive the transactions 160, but may have direct access to them as they are generated in a combined computing system. The ALI 100 may, in response to receipt of the transactions 160, perform one or more anonymization techniques on the transactions 160 before transmitting them (or allowing them to be transmitted) outside of the secure area as one or more anonymized transactions 165. In various embodiments, the ALI 100 may additionally generate and transmit one or more fake anonymized transactions 170, which may be transmitted outside of the secure area in association with the one or more anonymized transactions 165. In various embodiments, the transmission of these fake anonymized transactions 170 may be made contemporaneously with transmission of the anonymized transactions 165, and the various anonymized transactions may be mixed together, such that an entity viewing the transmission may not be able to discern which anonymized transactions are real (e.g. generated by system 105) and which are fake (e.g., generated by the ALI 100).

In various embodiments, the ALI 100 may be configured to receive results of processing of the anonymized transactions 165 and the fake anonymized transactions 170. In various embodiments, these results may be received from the non-secure network 150, or elsewhere outside of the secure area. In various embodiments these results may include valid results 190, such as those received in response to processing of the anonymized transactions 165. In various embodiments, the results may also include invalid results 180, such as those received in response to processing of the fake anonymized transactions 170. In various embodiments, the ALI 100 may be configured to identify which results are valid results 190 and which results are invalid results 180. In various embodiments, the ALI 100 may be configured to store indications of the anonymized transactions 165 and/or the fake anonymized transactions 170 in order to identify which results are valid or invalid. After identification of invalid results 180 and valid results 190, ALI 100 may be configured to provide the valid results 190 to the system 105. Thus, through usage of the ALI 100, the system 105 may receive results for its transactions 160, while maintaining a desired service level of anonymity as information from the transactions is transmitted outside of the secure area.

In various embodiments, the ALI 100 may be configured to include one or more modules and/or storage systems to implement techniques described herein. While particular modules and storage systems are illustrated in FIG. 1, it may be understood that, in various embodiments, modules may be combined, split into separate modules, substituted by different modules, and/or omitted entirely. In various embodiments, the ALI 100 may include an anonymizer 110, which may be configured to anonymize one more transactions received from the system 105 to produce anonymized transactions 165. In various embodiments, the anonymizer 110 may be configured to perform various anonymization techniques, which may be understood by one of ordinary skill. For example, the anonymizer 110 may be configured to remove identifying information from transactions 160, to substitute identifying information, to combine transactions, to remove transactions, etc. In other embodiments, the anonymizer 110 may be configured to perform other operations on identifying information, including hiding, hashing of identifying information, truncating identifying information, tokenizing identifying information, etc. In various embodiments, these and other techniques may be performed on identifying information or pseudo-identifying information, such as information that may not uniquely identify a person alone, but may provide identification when combined with other information.

In various embodiments, the ALI 100 may also include an anonymous transaction metric determiner 120 ("MD 120"). In various embodiments, the MD 120 may be configured to accept indications of particular metrics along which anonymization should be measured. These metrics may be determined for one or more anonymized transactions (whether real or fake) that are to be transmitted outside of the secure area. For example, the MD 120 may be configured to determine k-anonymity, l-diversity, and/or t-closeness for anonymized transactions being transmitted out of the secure area. In other embodiments, other metrics, such as missingness and/or entropy may be determined, as may be understood by those of ordinary skill.

In various embodiments, the ALI 100 may include a metric satisfier 130 ("MS 130") which may be configured to determine whether the determined metrics have satisfied pre-determined desired service levels. If not, the MS 130 may be configured to generate the one or more fake anonymized transactions 170 in order to reach the desired service levels. In various embodiments, the MD 120 and MS 130 may therefore work in concert to repeatedly and/or continuously determine metrics and generate fake transactions until desired service levels are reached. Through this repeated adjustment, the ALI 100 may thus improve anonymization of the transactions 160 as they are transmitted out of the secure area.

In various embodiments, the ALI 100 may also include a valid result identifier 140 ("VI 140") which may be configured to receive the valid results 190 and the invalid results 180 and to return the valid results 190 to the system 105. In various embodiments, the VI 140 may be configured to consult a fake transaction record 145, which may maintain a record of indications of fake transactions 170 that were generated by the MS 130 prior to the fake transactions being transmitted out of the secure area.

Particular embodiments and examples of activities of the anonymizer 110, MD 120, MS 130, and VI 140 are described below.

Figure 2:
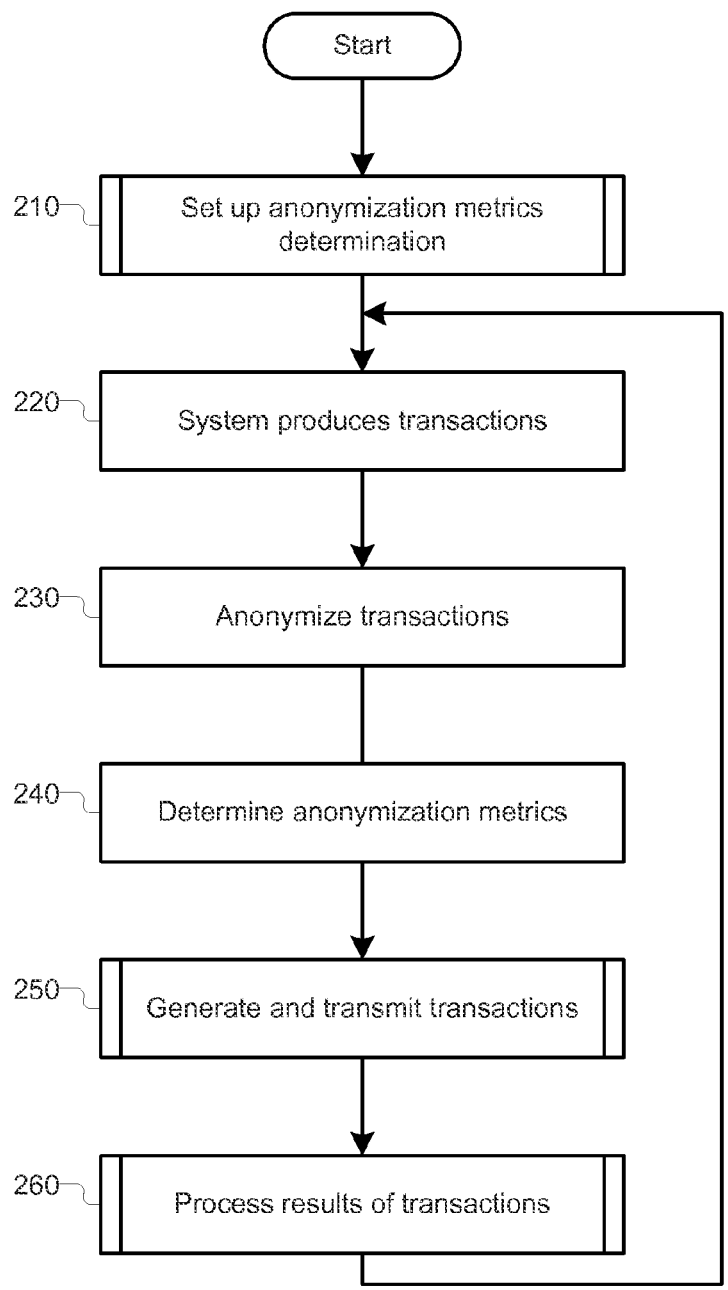
FIG. 2 illustrates an example process for reaching anonymization service levels, in accordance with various embodiments.

Referring now to FIG. 2, an example process 200 for reaching anonymization service levels is illustrated in accordance with various embodiments. In various embodiments, the ALI 100 as well as modules of the ALI 100 may perform process 200. While particular operations and sub-processes are shown in a particular order, it may be recognized that, in various embodiments, the operations may be re-ordered, combined, split into additional operations or processes, and/or omitted altogether. The process may begin at operation 210, where the ALI 100 may be set up to with to determine anonymization metrics. For example, at operation 210, the ALI 100 may be given indication of which metrics are to be determined by the MD 120 and to what service levels the metrics are desired to reach. Particular examples of operation 210 are described below with reference to process 300 of FIG. 3.

Next, at operation 220, the system 105 may produce one or more transactions 160 for which it wishes to obtain results. In various embodiments, such transactions 160 may include, but are not limited to, health information transactions, financial transactions, banking transactions, electronic security transactions, etc. Next, at operation 230, the anonymizer 110 of the ALI 100 may anonymize the transactions 160 to produce one or more anonymized transactions 165. As discussed above, in various embodiments, anonymization of transactions 160 to produce anonymized transactions 165 may be performed by various techniques that may be understood by those of ordinary skill in the art. In various embodiments, such techniques may include field suppression/hiding, shifting, and/or hashing. Next, at operation 240, the MD 120 may determine one or more anonymization metrics based on the anonymized transactions 165. In various embodiments these anonymization metrics may include, but are not limited to, k-anonymity, l-diversity, and/or t-closeness and the like.

Next, at operation 250, the MS 130 may generate one or more fake anonymized transactions 170 to allow the ALI 100 to reach desired service levels for the one or more determined anonymization metrics and may transmit both the anonymized transactions 165 and the fake anonymized transactions 170 out of the secure area. Particular examples of operation 250 are described below with reference to process 400 of FIG. 4. At operation 260, the VI 140 may receive and process results of the transactions. This operation may include identifying and removing invalid results 180 as they are received and/or identifying valid results 190 and providing those to the system 105. The process may then repeat at operation 220 where more transactions may be received, metrics determined, fake anonymized transactions generated, and anonymized transactions (of both types) transmitted, and results processed.

As discussed above, FIG. 2 illustrates a particular ordering and flow of operations, however, in various embodiments, different flows may occur. For example, while it may be noted that while FIG. 2 illustrates results being received at each iteration of the illustrated loop, in some embodiments, multiple iterations of receipt of transactions, generation of fake anonymized transactions, and transmitting of anonymized transactions may occur without intervening receipt of results. Similarly, in some embodiments, metrics may be repeatedly determined and fake anonymized transactions generated before any transactions are sent.

Figure 3:
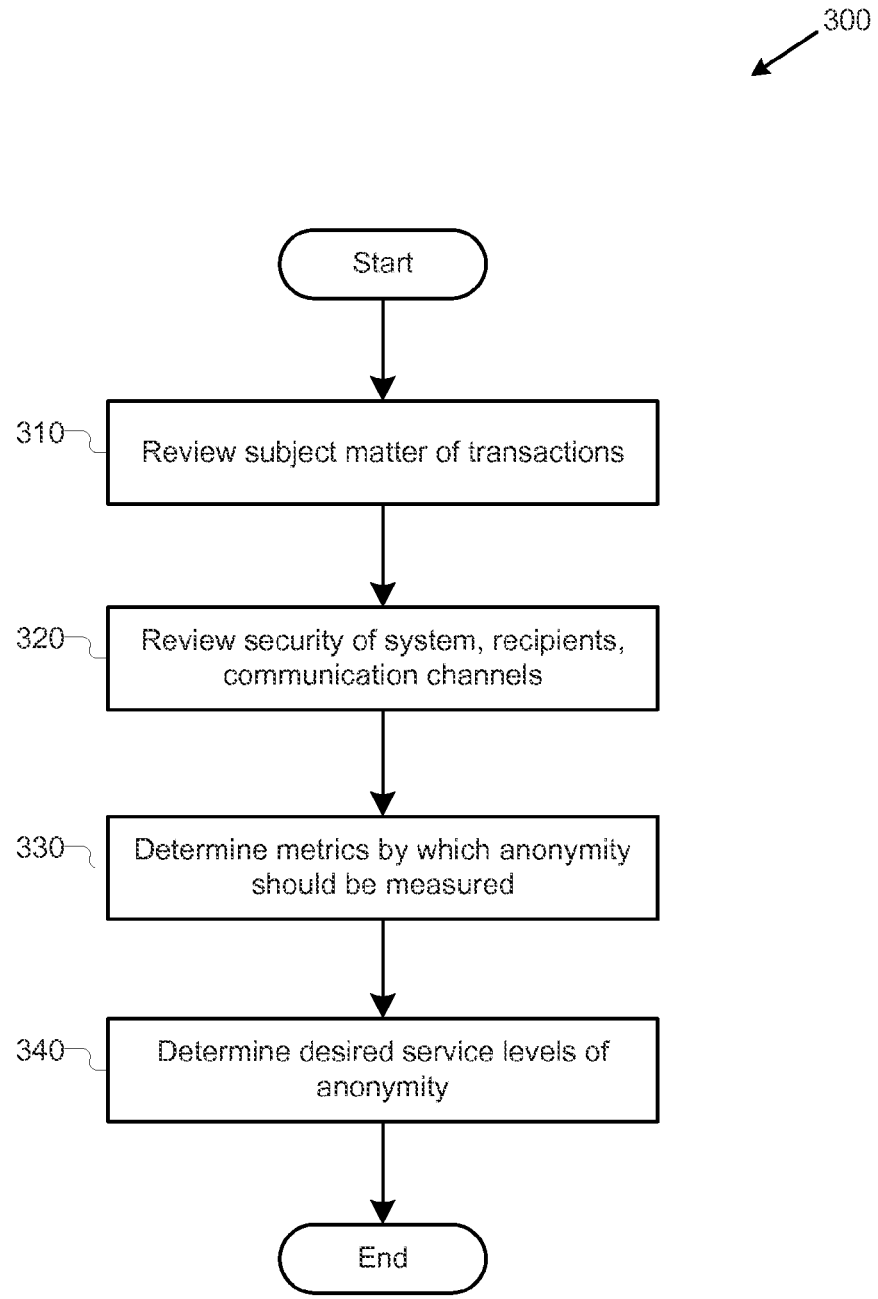
FIG. 3 illustrates an example process for setting up anonymization metrics determination, in accordance with various embodiments.

Referring now to FIG. 3, an example process 300 for setting up anonymization metrics determination is illustrated in accordance with various embodiments. In various embodiments, the ALI 100, and in particular the anonymizer 110 and the MD 120, may perform process 300. While particular operations and sub-processes are shown in a particular order, it may be recognized that, in various embodiments, the operations may be re-ordered, combined, split into additional operations or processes, and/or omitted altogether. The process may begin at operation 310, where a review of the subject matter of the transactions 160 may be performed. Through reviewing the subject matter, the ALI 100 may be better equipped to perform appropriate anonymization and to determine appropriate metrics for the transactions 160. In various embodiments, the ALI 100 itself may be given indications of the subject matter of the transactions 160 such as through selection of pre-determined subject matter examples, or through analysis of current or past transactions 160. In other embodiments, a user may review the subject matter of the transactions manually. Next, at operation 320, the ALI 100 (or a user) may review security of the system, recipients, and communication channels (such as non-secure network 150) that will be used in the transmission of anonymized transactions 185 and valid results 190. This knowledge may additionally aid the ALI 100 in performing proper determination of anonymization metrics for the anonymized transactions 165. Next, at operation 330, the ALI 100 and in particular the MD 120 may determine by which metrics anonymity should be measured for the transactions 160. Alternatively, in various embodiments, a user may provide one or more of the metrics or services levels to the ALI 100. Next, at operation 340, the ALI 100, and in particular the MD 120, may determine desired service levels for these metrics. Thus, for example, in various embodiments, the MD 120 may determine a level of k-anonymity, a level of l-diversity, and/or a level of entropy.

Figure 4:
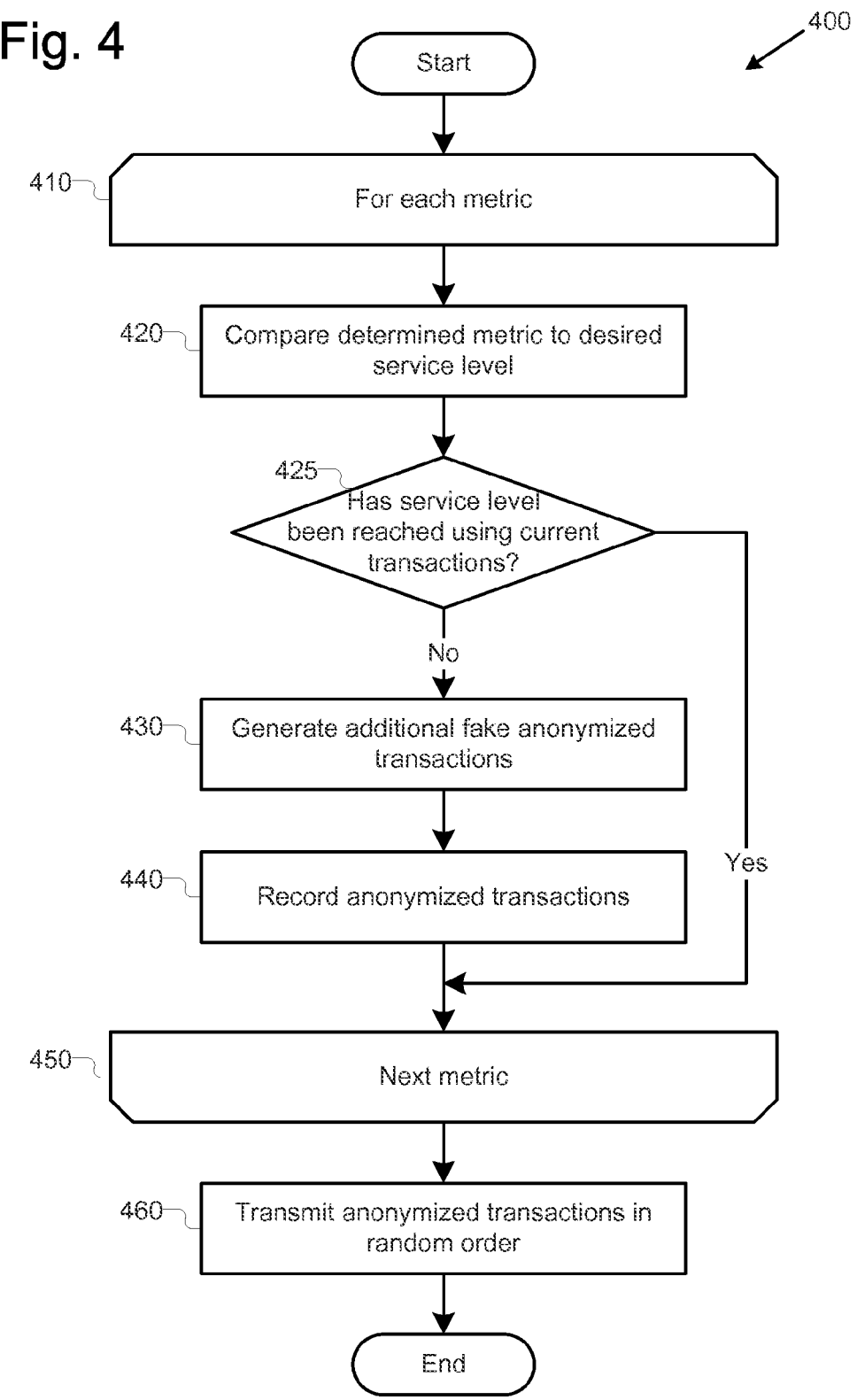
FIG. 4 illustrates an example process for generating and sending transactions to improve anonymization service levels, in accordance with various embodiments.

Referring now to FIG. 4, an example process 400 for generating and sending transactions to improve anonymization service levels is illustrated in accordance with various embodiments. In various embodiments, the ALI 100, and in particular the MS 130, may perform process 400. While particular operations and sub-processes are shown in a particular order, it may be recognized that, in various embodiments, the operations may be re-ordered, combined, split into additional operations or processes, and/or omitted altogether. The process may begin at loop operation 410, where a loop may begin for reach anonymization metric that has being determined by the MD 120. At operation 420, the MS 130 may compare the metric determined by the MD 120 to the desired service level determined as part of operation 300. At decision operation 425, the MD may determine whether the desired service level has been reached using current anonymized transactions. In various embodiments, these current anonymized transactions may include both anonymized transactions 165 (anonymized by the anonymizer 110 from transactions 160 generated by the system 105) as well as any previously generated fake anonymized transactions 170. If the desired service levels have been reached, then at loop operation 450, the loop may be repeated for the next metric.

If, however, the desired service level has not be reached for the metric in question, then at operation 430, the MS 130 may generate additional fake anonymized transactions 170. In various embodiments, these fake anonymized transactions may be generated specifically to increase the level of the metric in question. For example, the metric may be k-anonymization, which states that, for a person whose data is to be transmitted, that data cannot be distinguished from at least k–1 other persons who's information is also being transmitted. In such a case, the MS 130 may generate sufficient additional transactions to reach a level of k–1 transactions from which the person's data cannot be distinguished. In various embodiments, the MS 130 may, during operation 430, generate fake anonymized transactions that are similar to existing anonymized transactions 165 but which differ in one or more aspects so as to make them different, but not distinguishable. In other embodiments, the transactions may be less similar.

After generation of the fake anonymized transactions 170, the generated fake anonymized transactions 170 may be recorded, such as in the fake transaction record 145, for later use by the VI 140 when results are received. The loop may then repeat for the next metric at loop operation 450. After completion of the loop, at operation 460 the anonymized transactions 165 and the fake anonymized transactions 170 may be transmitted by the ALI 100. In various embodiments, the different transactions may be transmitted in an random order (or other mixed order) in order to obfuscate which transactions are anonymized transactions 165 created from the transactions 160 and which are fake anonymized transactions 170. After transmission of the various anonymized transactions, the process may then end.

Figure 5:
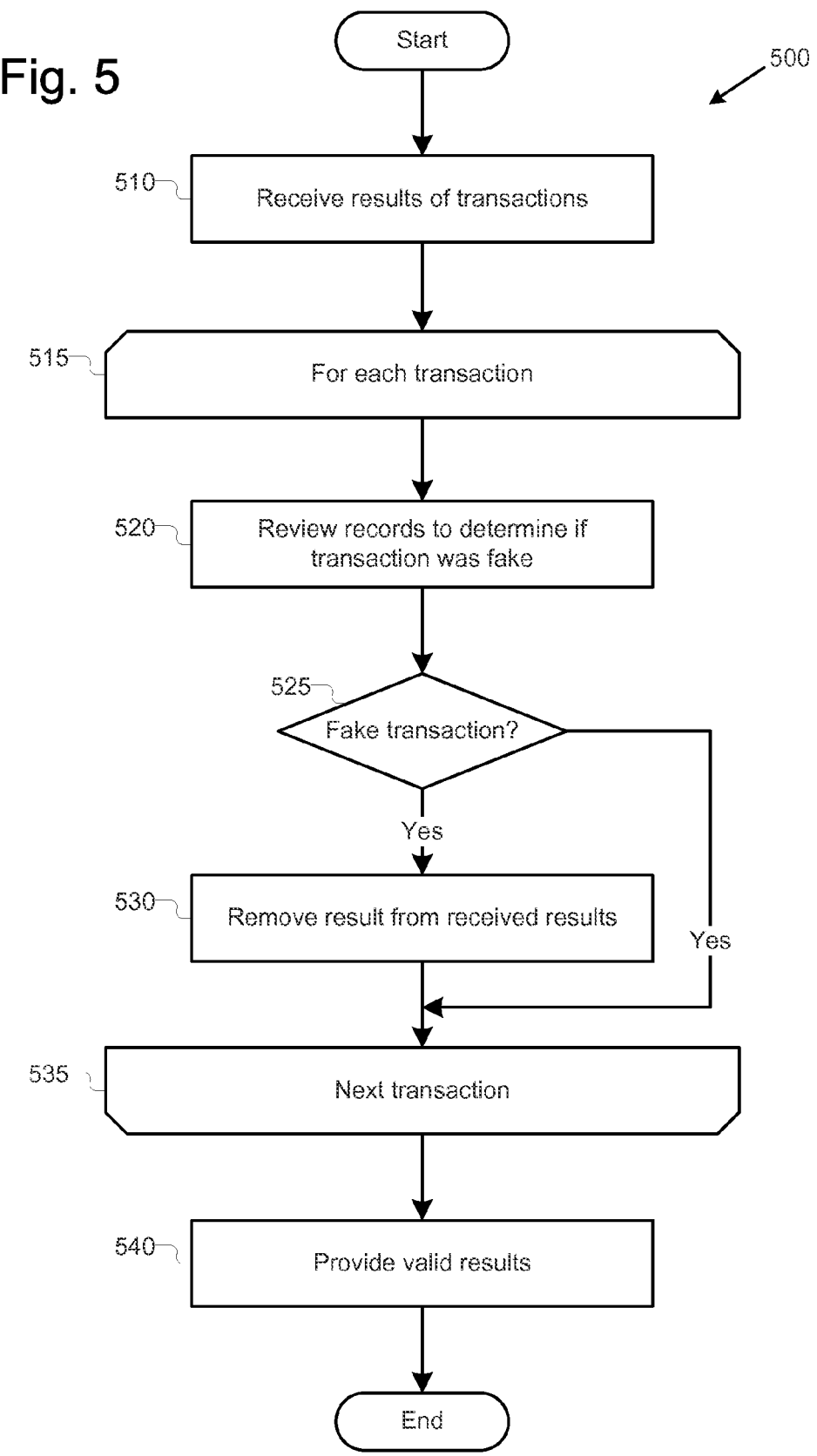
FIG. 5 illustrates an example process for processing received results of transactions, in accordance with various embodiments.

Referring now to FIG. 5, an example process 500 for processing received results of transactions is illustrated in accordance with various embodiments. In various embodiments, the ALI 100, and in particular the VI 140, may perform process 500. While particular operations and sub-processes are shown in a particular order, it may be recognized that, in various embodiments, the operations may be re-ordered, combined, split into additional operations or processes, and/or omitted altogether. The process may begin at loop operation 510, where the VI 140 may receive results of processing of the anonymized transactions 165 and the fake anonymized transactions 170, such as over the non-secure network 150. In various embodiments, these results may include both valid results 190 and invalid results 180. Next, at loop operation 515, the VI 140 may begin a loop for each of the results received. At operation 520, the VI 140 may review records in the fake transaction record 145 to determine is the current results stems from a fake anonymized transaction 170, and is therefore an invalid result 180. At decision operation 525, the VI 140 may thus determine whether the result is an invalid result 180. If so, then at operation 530, the invalid result 180 may be removed from the received results. In either event, the process may then repeat the loop for the next received result at loop operation 535. After the loop ends, at operation, the remaining valid results 190 may be provided by the VI 140 to the system 105. The process may then end.

Figure 6:
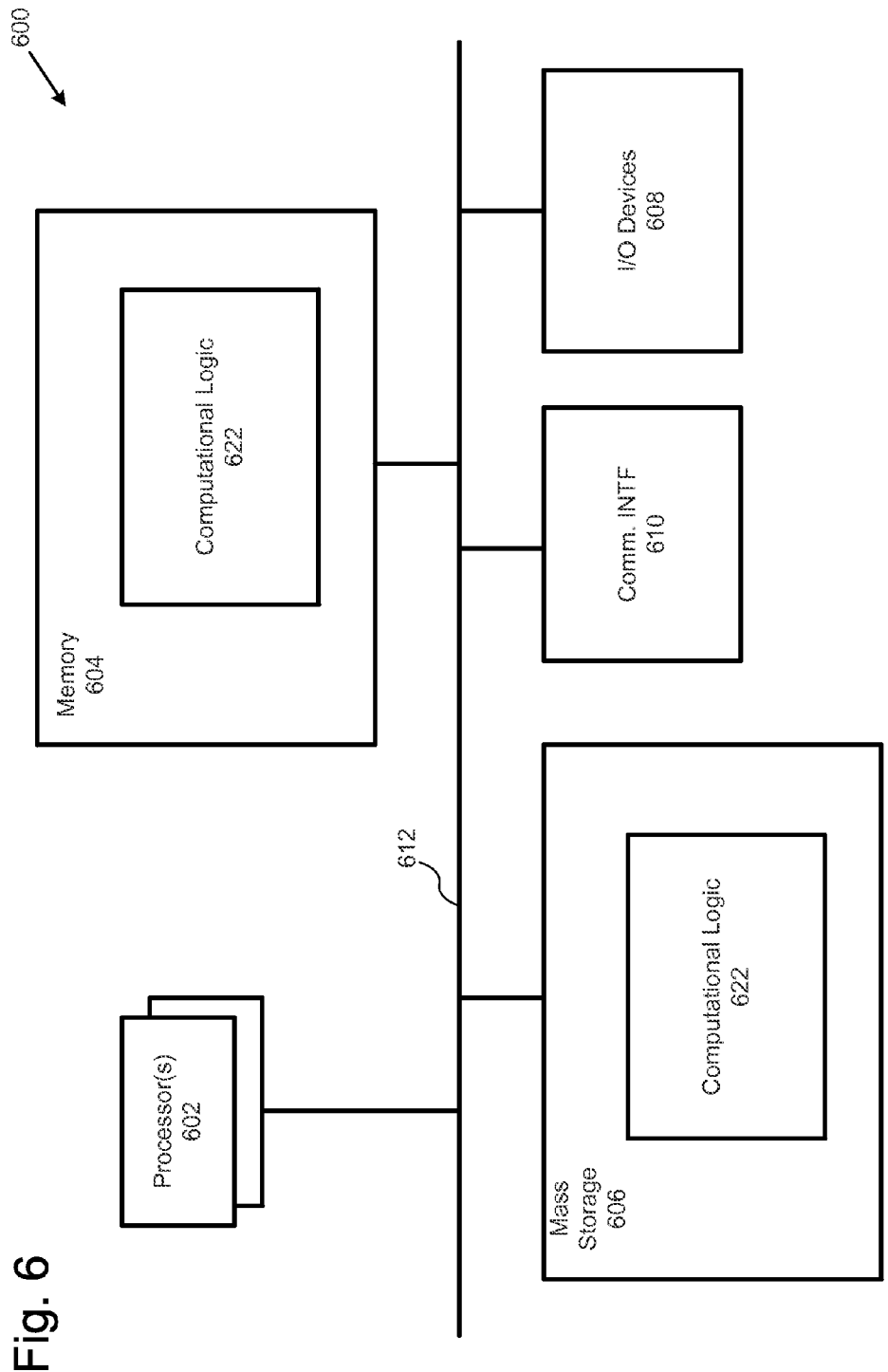
FIG. 6 illustrates an example computing environment suitable for practicing various aspects of the present disclosure in accordance with various embodiments.

Referring now to FIG. 6, an example computer suitable for practicing various aspects of the present disclosure, including processes of FIGS. 2-5, is illustrated in accordance with various embodiments. As shown, computer 600 may include one or more processors or processor cores 602, and system memory 604. For the purpose of this application, including the claims, the terms "processor" and "processor cores" may be considered synonymous, unless the context clearly requires otherwise. Additionally, computer 600 may include mass storage devices 606 (such as diskette, hard drive, compact disc read only memory (CD-ROM) and so forth), input/output devices 608 (such as display, keyboard, cursor control, remote control, gaming controller, image capture device, and so forth) and communication interfaces 610 (such as network interface cards, modems, infrared receivers, radio receivers (e.g., Bluetooth, WiFi, Near Field Communications, Radio-frequency identification, and so forth). The elements may be coupled to each other via system bus 612, which may represent one or more buses. In the case of multiple buses, they may be bridged by one or more bus bridges (not shown).

Each of these elements may perform its conventional functions known in the art. In particular, system memory

604 and mass storage devices 606 may be employed to store a working copy and a permanent copy of the programming instructions implementing one or more of the modules or activities shown in FIG. 1 and/or the operations associated with techniques shown in FIGS. 2-5, collectively referred to as computing logic 622. The various elements may be implemented by assembler instructions supported by processor(s) 602 or high-level languages, such as, for example, C, that can be compiled into such instructions.

The permanent copy of the programming instructions may be placed into permanent storage devices 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and program various computing devices. In embodiments, the programming instructions may be stored in one or more computer readable non-transitory storage media. In other embodiments, the programming instructions may be encoded in transitory storage media, such as signals.

The number, capability and/or capacity of these elements 610-612 may vary. Their constitutions are otherwise known, and accordingly will not be further described.

Figure 7:
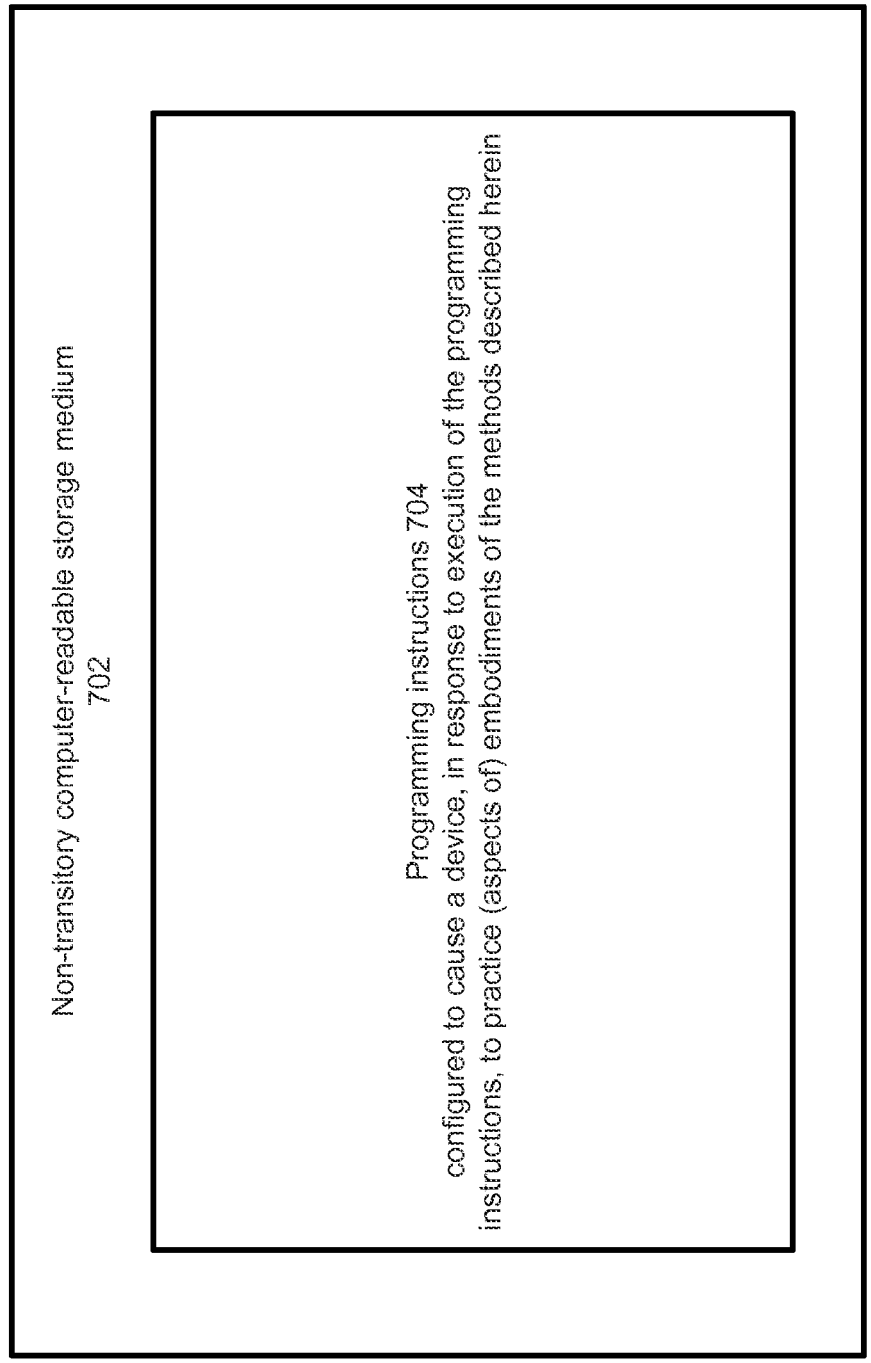
FIG. 7 illustrates an example storage medium with instructions configured to enable an apparatus to practice various aspects of the present disclosure in accordance with various embodiments.

FIG. 7 illustrates an example least one computer-readable storage medium 702 having instructions configured to practice all or selected ones of the operations associated with the techniques earlier described, in accordance with various embodiments. As illustrated, least one computer-readable storage medium 702 may include a number of programming instructions 704. Programming instructions 704 may be configured to enable a device, e.g., computer 600, in response to execution of the programming instructions, to perform, e.g., various operations of processes of FIGS. 2-5, e.g., but not limited to, to the various operations performed to perform improvement of anonymization service levels. In alternate embodiments, programming instructions 704 may be disposed on multiple least one computer-readable storage media 702 instead.

Referring back to FIG. 6, for one embodiment, at least one of processors 602 may be packaged together with computational logic 622 configured to practice aspects of processes of FIGS. 2-5. For one embodiment, at least one of processors 602 may be packaged together with computational logic 622 configured to practice aspects of processes of FIGS. 2-5 to form a System in Package (SiP). For one embodiment, at least one of processors 602 may be integrated on the same die with computational logic 622 configured to practice aspects of processes of FIGS. 2-5. For one embodiment, at least one of processors 602 may be packaged together with computational logic 622 configured to practice aspects of processes of FIGS. 2-5 to form a System on Chip (SoC). For at least one embodiment, the SoC may be utilized in, e.g., but not limited to, a computing tablet. (e.g., WiFi, Blue Tooth, Blue Tooth Low Energy, Near Field Communications, Radio-frequency identification (RFID), etc.) and other components as necessary to meet functional and non-functional requirements of the system.

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques. Particular examples of embodiments, described herein include, but are not limited to, the following:

Example 1 may include an apparatus for secure data transactions. The apparatus may include one or more computer processors. The apparatus may also include an anonymous transaction metrics determiner which may be executed by the one or more computer processors to determine one or more anonymization metrics for a first set of anonymized transactions to be transmitted out of a secure area. The apparatus may also include an anonymization metric satisfier. The anonymization metric satisfier may be executed by the one or more computer processors to analyze the one or more anonymization metrics determined for the first set of anonymized transactions with respect to meeting one or more service levels and generate a second set of one or more anonymized transactions that, when combined with the first set, cause the one or more anonymization metrics for the combined first and second sets to meet the one or more service levels.

Example 2 may include the apparatus of example 1, wherein the apparatus may further include an anonymizer to be executed by the one or more computer processors to receive a set of non-anonymized transactions and generate the first set of anonymized transactions through anonymization of data associated with the non-anonymized transactions.

Example 3 may include the apparatus of example 1, wherein the apparatus may further include a transaction transmitter to be executed by the one or more computer processors to transmit the combined first and second sets of anonymized transactions.

Example 4 may include the apparatus of example 3, wherein the transaction transmitter may be to transmit the anonymized transactions from the combined first and second sets in a substantially randomized order.

Example 5 may include the apparatus of any of examples 1-4, wherein the anonymous transaction metrics determiner and the anonymization metric satisfier may be to perform the determination, analysis, and generation prior to any of the first set of anonymized transactions being sent out of the secure area.

Example 6 may include the apparatus of any of examples 1-5, wherein the one or more anonymization metrics may include one or more of: k-anonymity, l-diversity, t-closeness, and entropy.

Example 7 may include the apparatus of any of examples 1-6, wherein the one or more anonymization metrics may include k-anonymity and, for a service level k, the anonymization metric satisfier may be to generate for at least one anonymous transaction of the first set, one or more substantially similar anonymized transactions for the second set, such that a number of substantially similar transactions for the at least one anonymous transaction in the combined first and second set is greater than or equal to k.

Example 8 may include the apparatus of any of examples 1-7, wherein the anonymization metric satisfier may be further to be executed to receive the one or more anonymization metrics or the one or more service levels.

Example 9 may include the apparatus of any of examples 1-8, wherein at least one of the anonymized transactions of the first set may include a request for a result from a non-secure area outside the secure area.

Example 10 may include the apparatus of example 9, wherein the anonymization metric satisfier may be further to be executed to account for anonymized transactions of the second set having been included in the combined first and second sets, when results are returned from the non-secure area.

Example 11 may include the apparatus of example 10, wherein the anonymization metric satisfier may be to account for anonymized transactions of the second set having been included in the combined first and second sets through recordation of the anonymized transactions of the second set and removal of results received for the recorded anonymized transactions of the second set.

Example 12 may include a computer-implemented method for securing data transactions. The method may include determining, by a computing system, one or more anonymization metrics for a first set of anonymized transactions to be transmitted out of a secure area; analyzing, by the computing system, the one or more anonymization metrics determined for the first set of anonymized transactions with respect to meeting one or more service levels; and generating, by the computing system, a second set of one or more anonymized transactions that, when combined with the first set, cause the one or more anonymization metrics for the combined first and second sets to meet the one or more service levels.

Example 13 may include the method of example 12 and may further include receiving, by the computing system, a set of non-anonymized transactions and generating, by the computing system, the first set of anonymized transactions through anonymization of data associated with the non-anonymized transactions.

Example 14 may include the method of example 12, further including transmitting, by the computing system, the combined first and second sets of anonymized transactions.

Example 15 may include the method of example 14, wherein transmitting the anonymized transactions from the combined first and second sets may include transmitting the anonymized transactions in a substantially randomized order.

Example 16 may include the method of any of examples 12-15, wherein the determining, analyzing, and generating may be performed prior to any of the first set of anonymized transactions being sent out of the secure area.

Example 17 may include the method of any of examples 12-16, wherein analyzing the one or more anonymization metrics may include analyzing one or more of: k-anonymity, l-diversity, t-closeness, and entropy.

Example 18 may include the method of any of examples 12-17, wherein analyzing the one or more anonymization metrics may include analyzing k-anonymity; and generating a second set of one or more anonymized transactions may include, for a service level k, generating, for at least one anonymous transaction of the first set, one or more substantially similar anonymized transactions for the second set, such that a number of substantially similar transactions for the at least one anonymous transaction in the combined first and second set is greater than or equal to k.

Example 19 may include the method of any of examples 12-18, and may further include receiving, by the computing system, the one or more anonymization metrics or the one or more service levels.

Example 20 may include the method of any of examples 12-19, wherein at least one of the anonymized transactions of the first set may include a request for a result from a non-secure area outside the secure area.

Example 21 may include the method of example 20, and may further include accounting, by the computing system, for anonymized transactions of the second set having been included in the combined first and second sets when results are returned from the non-secure area.

Example 22 may include the method of example 21, wherein accounting for anonymized transactions of the second set having been included in the combined first and second sets may include recording the anonymized transactions of the second set and removing results received for the recorded anonymized transactions of the second set.

Example 23 may include one or more non-transitory computer-readable media that may include instructions written thereon that, in response to execution by a computing system, may cause the computing system to secure data transactions. The instructions may be to cause the computing system to: determine one or more anonymization metrics for a first set of anonymized transactions to be transmitted out of a secure area; analyze the one or more anonymization metrics determined for the first set of anonymized transactions with respect to meeting one or more service levels; and generate a second set of one or more anonymized transactions that, when combined with the first set, cause the one or more anonymization metrics for the combined first and second sets to meet the one or more service levels.

Example 24 may include the computer-readable media of example 23, wherein the instructions may be further to cause the computing system to receive a set of non-anonymized transactions; and generate the first set of anonymized transactions through anonymization of data associated with the non-anonymized transactions.

Example 25 may include the computer-readable media of example 23, wherein the instructions may be further to cause the computing system to transmit the combined first and second sets of anonymized transactions.

Example 26 may include the computer-readable media of example 25, wherein transmit the anonymized transactions from the combined first and second sets may include transmit the anonymized transactions in a substantially randomized order.

Example 27 may include the computer-readable media of any of examples 23-26, wherein the determine, analyze, and generate may be performed prior to any of the first set of anonymized transactions being sent out of the secure area.

Example 28 may include the computer-readable media of any of examples 23-27, wherein analyze the one or more anonymization metrics may include analyze one or more of: k-anonymity, l-diversity, t-closeness, and entropy.

Example 29 may include the computer-readable media of any of examples 23-28, wherein analyze the one or more anonymization metrics may include analyze k-anonymity and generate a second set of one or more anonymized transactions may include, for a service level k, generate, for at least one anonymous transaction of the first set, one or more substantially similar anonymized transactions for the second set, such that a number of substantially similar transactions for the at least one anonymous transaction in the combined first and second set is greater than or equal to k.

Example 30 may include the computer-readable media of any of examples 23-29, wherein the instructions may be further to cause the computing system to receive the one or more anonymization metrics or the one or more service levels.

Example 31 may include the computer-readable media of any of examples 23-30, wherein at least one of the anonymized transactions of the first set may include a request for a result from a non-secure area outside the secure area.

Example 32 may include the computer-readable media of example 31, wherein the instructions may be further to cause the computing system to account for anonymized transactions of the second set having been included in the combined first and second sets when results are returned from the non-secure area.

Example 33 may include the computer-readable media of example 32, wherein account for anonymized transactions of the second set having been included in the combined first and second sets may include record the anonymized transactions of the second set and remove results received for the recorded anonymized transactions of the second set.

Example 34 may include an apparatus for securing data transactions. The apparatus may include: means for determining one or more anonymization metrics for a first set of anonymized transactions to be transmitted out of a secure area; means for analyzing the one or more anonymization metrics determined for the first set of anonymized transactions with respect to meeting one or more service levels; and means for generating a second set of one or more anonymized transactions that, when combined with the first set, cause the one or more anonymization metrics for the combined first and second sets to meet the one or more service levels.

Example 35 may include the apparatus of example 34, and may further include means for receiving a set of non-anonymized transactions and means for generating the first set of anonymized transactions through anonymization of data associated with the non-anonymized transactions.

Example 36 may include the apparatus of example 34, and may further include means for transmitting the combined first and second sets of anonymized transactions.

Example 37 may include the apparatus of example 36, wherein means for transmitting the anonymized transactions from the combined first and second sets may include means for transmitting the anonymized transactions in a substantially randomized order.

Example 38 may include the apparatus of any of examples 34-37, wherein the means for determining, means for analyzing, and means for generating may perform determination, analysis, and generation prior to any of the first set of anonymized transactions being sent out of the secure area.

Example 39 may include the apparatus of any of examples 34-38, wherein means for analyzing the one or more anonymization metrics may include one or more of: means for analyzing k-anonymity, means for analyzing l-diversity, means for analyzing t-closeness, and means for analyzing entropy.

Example 40 may include the apparatus of any of examples 34-39, wherein means for analyzing the one or more anonymization metrics may include means for analyzing k-anonymity; and means for generating a second set of one or more anonymized transactions may include, for a service level k, means for generating, for at least one anonymous transaction of the first set, one or more substantially similar anonymized transactions for the second set, such that a number of substantially similar transactions for the at least one anonymous transaction in the combined first and second set is greater than or equal to k.

Example 41 may include the apparatus of any of examples 34-40, and may further include means for receiving the one or more anonymization metrics or the one or more service levels.

Example 42 may include the apparatus of any of examples 34-41, wherein at least one of the anonymized transactions of the first set may include a request for a result from a non-secure area outside the secure area.

Example 43 may include the apparatus of example 42, and may further include means for accounting for anonymized transactions of the second set having been included in the combined first and second sets when results are returned from the non-secure area.

Example 44 may include the apparatus of example 43, wherein means for accounting for anonymized transactions of the second set having been included in the combined first and second sets may include means for recording the anonymized transactions of the second set and means for removing results received for the recorded anonymized transactions of the second set.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus, comprising:
   one or more computer processors;
   an anonymous transaction metrics determiner to be executed by the one or more computer processors to determine one or more anonymization metrics for a first set of anonymized transactions to be transmitted out of a secure area;
   an anonymization metric satisfier to be executed by the one or more computer processors to:
      analyze the one or more anonymization metrics determined for the first set of anonymized transactions with respect to satisfying one or more service levels;
      generate a second set of one or more anonymized transactions that, when combined with the first set, cause the one or more anonymization metrics for the combined first and second sets to satisfy the one or more service levels, wherein the first set of anonymized transactions is associated with respective real transactions and the second set of one or more anonymized transactions is associated with respective fake transactions;
      when the one or more service levels is satisfied, transmit, to a second apparatus associated with a non-secure area, the first set of anonymized transactions and the second set of one or more anonymized transactions; and
   a valid result identifier to be executed by the one or more computer processors to:
      receive, from the second apparatus, first results associated with the first set of anonymized transactions and second results associated with the second set of one or more anonymized transactions.

2. The apparatus of claim 1, wherein the apparatus further comprises:
   an anonymizer to be executed by the one or more computer processors to:
      receive a set of non-anonymized transactions comprising the real transactions; and generate the first set of anonymized transactions through anonymization of data associated with the non-anonymized transactions.

3. The apparatus of claim 1, wherein the apparatus further comprises a transaction transmitter to be executed by the one or more computer processors to transmit the combined first and second sets of anonymized transactions.

4. The apparatus of claim 3, wherein the transaction transmitter is to transmit the anonymized transactions from the combined first and second sets in a substantially randomized order.

5. The apparatus of claim 1, wherein the anonymous transaction metrics determiner and the anonymization metric satisfier are to perform the determination, analysis, and generation prior to any of the first set of anonymized transactions being sent out of the secure area.

6. The apparatus of claim 1, wherein the one or more anonymization metrics include one or more of: k-anonymity, l-diversity, t-closeness, and entropy.

7. The apparatus of claim 1, wherein:
the one or more anonymization metrics include k-anonymity; and
for a service level k, the anonymization metric satisfier is to generate for at least one anonymous transaction of the first set, one or more substantially similar anonymized transactions for the second set, such that a number of substantially similar transactions for the at least one anonymous transaction in the combined first and second set is greater than or equal to k.

8. The apparatus of claim 1, wherein the anonymization metric satisfier is further to be executed to receive the one or more anonymization metrics or the one or more service levels.

9. The apparatus of claim 1, wherein at least one of the anonymized transactions of the first set includes a request for a result from a non-secure area outside the secure area.

10. The apparatus of claim 9, wherein the anonymization metric satisfier is further to be executed to account for anonymized transactions of the second set having been included in the combined first and second sets, when results are returned from the non-secure area.

11. The apparatus of claim 10, wherein the anonymization metric satisfier is to account for anonymized transactions of the second set having been included in the combined first and second sets, through:
recordation of the anonymized transactions of the second set; and
removal of results received for the recorded anonymized transactions of the second set.

12. One or more non-transitory computer-readable media comprising instructions written thereon that, in response to execution by a first computing system, causes the first computing system to:
determine one or more anonymization metrics for a first set of anonymized transactions to be transmitted out of a secure area;
analyze the one or more anonymization metrics determined for the first set of anonymized transactions with respect to satisfying one or more service levels;
generate a second set of one or more anonymized transactions that, when combined with the first set, cause the one or more anonymization metrics for the combined first and second sets to satisfy the one or more service levels, wherein the first set of anonymized transactions is associated with respective real transactions and the second set of one or more anonymized transactions is associated with respective fake transactions;

when the one or more service levels is satisfied, transmit, to a second computing system associated with a non-secure area, the first set of anonymized transactions and the second set of one or more anonymized transactions; and
receive, from the second computing system, first results associated with the first set of anonymized transactions and second results associated with the second set of one or more anonymized transactions.

13. The computer-readable media of claim 12, wherein the instructions are further to cause the computing system to:
receive a set of non-anonymized transactions comprising the real transactions; and
generate the first set of anonymized transactions through anonymization of data associated with the non-anonymized transactions.

14. The computer-readable media of claim 12, wherein the instructions are further to cause the computing system to transmit the combined first and second sets of anonymized transactions.

15. The computer-readable media of claim 14, wherein transmit the anonymized transactions from the combined first and second sets comprises transmit the anonymized transactions in a substantially randomized order.

16. The computer-readable media of claim 12, wherein the determine, analyze, and generate are performed prior to any of the first set of anonymized transactions being sent out of the secure area.

17. The computer-readable media of claim 12, wherein analyze the one or more anonymization metrics comprises analyze one or more of: k-anonymity, l-diversity, t-closeness, and entropy.

18. The computer-readable media of claim 12, wherein at least one of the anonymized transactions of the first set includes a request for a result from a non-secure area outside the secure area.

19. The computer-readable media of claim 18, wherein the instructions are further to cause the computing system to account for anonymized transactions of the second set having been included in the combined first and second sets when results are returned from the non-secure area.

20. The computer-readable media of claim 19, wherein account for anonymized transactions of the second set having been included in the combined first and second sets comprises:
record the anonymized transactions of the second set; and
remove results received for the recorded anonymized transactions of the second set.

21. A computer-implemented method, comprising:
determining, by a first computing system, one or more anonymization metrics for a first set of anonymized transactions to be transmitted out of a secure area;
analyzing, by the first computing system, the one or more anonymization metrics determined for the first set of anonymized transactions with respect to satisfying one or more service levels;
generating, by the first computing system, a second set of one or more anonymized transactions that, when combined with the first set, cause the one or more anonymization metrics for the combined first and second sets to satisfy the one or more service levels, wherein the first set of anonymized transactions is associated with respective real transactions and the second set of one or more anonymized transactions is associated with respective fake transactions;
when the one or more service levels is satisfied, transmitting, to a second computing system associated with a non-secure area, the first set of anonymized transactions and the second set of one or more anonymized transactions; and receiving, from the second computing system, first results associated with the first set of anonymized transactions and second results associated with the second set of one or more anonymized transactions.

22. The method of claim 21, further comprising:

receiving, by the first computing system, a set of non-anonymized transactions comprising the real transactions; and generating, by the first computing system, the first set of anonymized transactions through anonymization of data associated with the non-anonymized transactions.

23. The method of claim 21, wherein at least one of the anonymized transactions of the first set includes a request for a result from a non-secure area outside the secure area.

24. The method of claim 23, further comprising accounting, by the first computing system, for anonymized transactions of the second set having been included in the combined first and second sets when results are returned from the non-secure area.

25. The method of claim 24, wherein accounting for anonymized transactions of the second set having been included in the combined first and second sets comprises:
recording the anonymized transactions of the second set; and
removing results received for the recorded anonymized transactions of the second set.

* * * * *